United States Patent
Zhu et al.

(10) Patent No.: US 12,074,938 B2
(45) Date of Patent: Aug. 27, 2024

(54) USER DEVICE, SERVER, METHOD, APPARATUS AND COMPUTER READABLE MEDIUM FOR NETWORK COMMUNICATION

(71) Applicant: Nokia Solutions and Networks Oy, Espoo (FI)

(72) Inventors: Jianhua Zhu, Shanghai (CN); Yifeng Yao, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/069,598

(22) Filed: Dec. 21, 2022

(65) Prior Publication Data

US 2023/0208905 A1    Jun. 29, 2023

(30) Foreign Application Priority Data

Dec. 24, 2021 (CN) .......................... 202111597749.5

(51) Int. Cl.
*H04L 67/1001* (2022.01)
*H04L 67/141* (2022.01)

(52) U.S. Cl.
CPC ........ *H04L 67/1001* (2022.05); *H04L 67/141* (2013.01)

(58) Field of Classification Search
CPC .......................... H04L 67/1001; H04L 67/141
USPC ........................................................ 709/227
See application file for complete search history.

(56) References Cited

U.S. PATENT DOCUMENTS

| 11,019,117 | B2 * | 5/2021 | Qian | .................. H04L 61/2589 |
| 2012/0203916 | A1 * | 8/2012 | Burns | .................... H04L 67/14 |
| | | | | 709/227 |
| 2013/0097322 | A1 | 4/2013 | Yang et al. | |
| 2014/0115177 | A1 * | 4/2014 | Wu | ...................... H04L 41/044 |
| | | | | 709/228 |
| 2015/0327248 | A1 * | 11/2015 | Griot | .................. H04W 72/542 |
| | | | | 370/252 |
| 2017/0180483 | A1 * | 6/2017 | Yang | ..................... G06F 9/5033 |
| 2021/0037105 | A1 * | 2/2021 | Smith-Denny | ......... H04L 67/51 |
| 2022/0382615 | A1 * | 12/2022 | Turk | ..................... G06F 11/079 |

(Continued)

FOREIGN PATENT DOCUMENTS

WO    WO-2011/117193 A2    9/2011
WO    WO-2017/041107 A1    3/2017

OTHER PUBLICATIONS

"TR-069 CPE WAN Management Protocol—Amendment 4," Jul. 1, 2011 (Jul. 1, 2011), XP055097503, Retrieved from the Internet: URL:http://www.broadband-forum.org/technical/download/TR-069_.Amendment-4.pdf [retrieved on Jan. 21, 2014].

(Continued)

*Primary Examiner* — Wing F Chan
*Assistant Examiner* — Leon Y Tseng
(74) *Attorney, Agent, or Firm* — Harness, Dickey & Pierce, P.L.C.

(57) ABSTRACT

An example embodiment includes transmitting first connection information that the user device is connected to a plurality of servers to a first server, and receiving a list of candidate servers from the first server, the candidate servers being determined by the first server at least based on the first connection information. The embodiment further includes selecting a second server from the list to establish a connection.

19 Claims, 6 Drawing Sheets

(56) References Cited

U.S. PATENT DOCUMENTS

2023/0030925 A1\* 2/2023 Wheelock ............... H04L 43/10
2023/0104116 A1\* 4/2023 Nosalis ............... H04L 67/1004
726/15

OTHER PUBLICATIONS

Search Report for European Application No. 22215189.6 dated Mar. 29, 2023.
European Office Action dated Feb. 22, 2024 issued in corresponding European Appln. No. 22 215 189.6.

\* cited by examiner

USER DEVICE, SERVER, METHOD, APPARATUS AND COMPUTER READABLE MEDIUM FOR NETWORK COMMUNICATION

CROSS-REFERENCE TO RELATED APPLICATIONS

This application claims priority to and the benefit of Chinese Patent Application No. 202111597749.5 filed on Dec. 24, 2021, the entire contents of which are incorporated herein by reference.

FIELD

The disclosure generally relates to network communication, and more specifically, to a user device, servers, methods, apparatuses and a computer readable medium for network communication.

BACKGROUND

With the rapidly increasing number of users of the network and the increasingly higher requirements for network communication performance, Internet Protocol (IP) version 6 (IPv6) is introduced on the basis of IP version 4 (IPv4) to adapt to the development of network communication. Currently, based on a TR-069 technical specification using the Customer Premises Equipment Wide Area Network Management Protocol (CWMP), the following functions for a user device are performed: automatic configuration, software image management or firmware image management, diagnostics, and the like. Prior to performing the CWMP function, it needs to establish a connection between the user device and an Automatic Configuration Server (ACS) via an IP network.

Therefore, with introduction of more possible new IP versions, for the user device side, the following issue arises: how to efficiently determine, from automatic configuration servers corresponding to different IP versions and IP addresses, a routing path from the server meeting the performance requirement to the automatic configuration servers. For a server side, it is desired to direct the user device to select an appropriate server to achieve a balance between optimization of the overall performance and the resources.

In addition, due to dynamic changes of the network configuration, the static configuration of the IP version and the IP address for the user device may result in a great delay or response time of the user device when initiating a connection to the network.

SUMMARY

In accordance with the first aspect of the present disclosure, there is provided a user device, comprising: at least one processor and at least one memory storing computer program codes. The at least one memory and the computer program codes are configured, together with the at least one memory, to cause the user device to: transmit, to a first server, first connection information that the user device is connected to a plurality of servers. The user device is further caused to receive a list of candidate servers from the first server, where the candidate servers are determined by the first server at least based on the first connection information. The user device is also caused to select a second server from the list to establish a connection.

In accordance with a second aspect of the present disclosure, there is provided a first server, comprising: at least one processor and at least one memory storing computer program codes. The at least one memory and the computer program codes are configured, together with the at least one processor, to cause the first server to: receive, from a user device, first connection information that the user device is connected to a plurality of servers. The first server is further caused to determine a plurality of candidate servers for the user device at least based on the received first connection information. The first server is also caused to transmit a list of the candidate servers to the user device.

In accordance with a third aspect of the present disclosure, there is provided a method implemented at a user device. The method comprises: transmitting, to a first server, first connection information that the user device is connected to a plurality of servers, and receiving a list of candidate servers from the first server, the candidate servers being determined by the first server at least based on the first connection information. The method further comprises selecting a second server from the list to establish a connection.

In accordance with a fourth aspect of the present disclosure, there is provided a method implemented at a first server. The method comprises: receiving, from a user device, first connection information that the user device is connected to a plurality of servers, and determining a plurality of candidate servers for the user device at least based on the received first connection information. The method further comprises transmitting a list of the candidate servers to the user device.

In accordance with a fifth aspect of the present disclosure, there is provided an apparatus for a user device. The apparatus comprises: a component for transmitting, to a first server, first connection information that the user device is connected to a plurality of servers, and a component for receiving a list of candidate servers from the first server, the candidate servers being determined by the first server at least based on the first connection information. The method further comprises a component for selecting a second server from the list to establish a connection.

In accordance with a sixth aspect of the present disclosure, there is provided an apparatus for a first server. The apparatus comprises: means for receiving, from a user device, first connection information that the user device is connected to a plurality of servers, and means for determining a plurality of candidate servers for the user device at least based on the first connection information received. The apparatus further comprises means for transmitting a list of the candidate servers to the user device.

In accordance with a seventh aspect of the present disclosure, there is provided a computer readable storage medium having program codes stored thereon, where the program codes are configured to cause, when executed, an apparatus to perform the method in accordance with the third or fourth aspect.

BRIEF DESCRIPTION OF THE DRAWINGS

The features, advantages and other aspects of various implementations of the present disclosure will become more apparent through the following detailed description with reference to the accompanying drawings, and several implementations of the present disclosure will be illustrated here in an exemplary way, without limitation. In the drawings.

Throughout the present disclosure, the same and similar reference symbols denote the same and similar elements.

DETAILED DESCRIPTION OF EMBODIMENTS

Reference will now be made to the drawings to describe the preferred implementations of the present disclosure in more detail. Although preferred implementations of the present disclosure are depicted in the drawings, it would be appreciated that the present disclosure could be carried out in various forms, rather than being confined to the implementations illustrated herein. Rather, those implementations are provided only to make the present disclosure more thorough and complement and to enable the scope of the present disclosure to be fully conveyed to those skilled in the art.

As used herein, the term "includes" and its variants are to be read as open-ended terms that mean "includes, but is not limited to." The term "or" is to be read as "and/or" unless indicated otherwise. The term "based on" is to be read as "based at least in part on." The term "an example implementation" and "an implementation" are to be read as "at least one example implementation." The term "another implementation" is to be read as "at least one another implementation." The terms "first," "second," and the like may refer to different objects or the same object. Other meanings explicit or implicit may be covered below.

As mentioned above, with the development of the network communication technology, the new IP version and the corresponding IP address have been introduced. Therefore, from the perspective of the user device, when initiating an IP network connection with an Automatic Configuration Server (ACS), it needs to select a plurality of ACSs corresponding to different IP versions and IP addresses.

In view of the above problem, a legacy approach is employed that the user device is configured with a static IP version and an IP address for an ACS. In this way, when initiating an IP network connection with an ACS, the user device is directly connected to the ACS corresponding to the static configuration. Prior to being reconfigured for an IP version and an IP address of a new ACS, the user device will not be connected to other ACS servers. Accordingly, even if the network is changed, the user device connected with the ACS will not change the connection with the ACS, which may result in an adverse impact on the connection performance Therefore, such configuration approach cannot adapt to dynamical changes of the network configuration.

A further approach is that, every time when establishing a connection, the user device establishes a connection with a respective ACS per IP version or IP address. Upon initiating a connection with an ACS, the user device can take into consideration dynamic changes of the network configuration, but the process of establishing connections one by one brings about great resource waste and a delay.

At least for solving the above technical issues, the embodiments of the present disclosure provide a mechanism for network communication. In the mechanism, the user device collects first connection information that the user device is connected to a plurality of servers and transmits the first connection information to the first sever, where the first connection information may include statistics information about that the user device is connected to the plurality of servers. Then, the first server determines candidate servers for the user device at least based on the first connection information. The first server may collect second connection information that one or more user devices are connected to the first server, the second connection information may include statistics information about that one or more user devices are connected with the first server, and the candidate servers for the user device are determined based on the first connection information and the second connection information. The candidate servers can be determined using a machine learning model based on the first connection information and/or the second connection information. The first server transmits a list of the candidate servers to the user device. The user device selects a second server from the list of candidate servers to establishing a connection.

In this way, the server can acquire the first connection information from the user device and specify a candidate server to the user device at least based on the first connection information such that, upon initiating a connection with a server or during a connection with a server, the user device can select an appropriate server to establish a connection or change the connection to the appropriate server. Therefore, since the first connection information and the second connection information that can reflect a global change of the network configuration when selecting a server are considered, the user device and the server can adapt to the dynamic changes of the network configuration and guarantee high connection efficiency.

Figure 1:
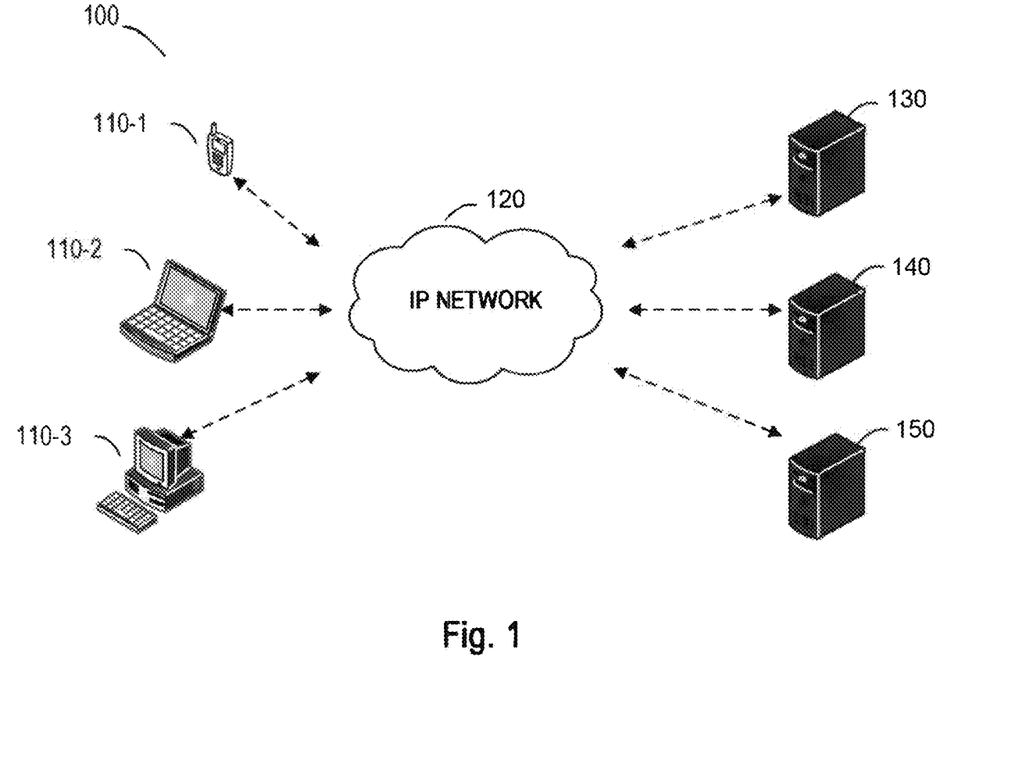
FIG. 1 illustrates an example network environment in which embodiments of the present disclosure can be implemented.

FIG. 1 illustrates an example environment 100 in which the example embodiments of the present disclosure can be implemented. The environment 100 includes a user device 110-1, a user device 110-2 and a user device 110-3 which may be collectively referred to as user device 110. The user device 110 may include, for example, but is not limited to, a wireless router, a cellular phone (e.g., a smartphone), a tablet, a laptop, a desktop computer, a portable media player, a wearable digital device (e.g., digital glasses, a wristband, a watch, a brooch, an armbands or the like), a TV, a set-top box (e.g. a junction box, a video player, a video streaming device and the like), a gaming system, user equipment (UE) and the like.

As shown in FIG. 1, the user device 110 is connected to one of a server 130, a server 140 and a server 150 via a routing path in an IP network 120. The IP network 120 may include, for example, at least one of IPv6 and Ipv4 networks. It would be appreciated that, with the development of the network communication technology, there may be other versions of IP networks, and the IPv6 and IPv4 networks are thus provided here only as an example, without suggesting any limitation. In addition, the IP network 120 further includes any other versions of IP networks possibly introduced in the future.

Examples of the server 130, the server 140 and the server 150 may include, for example, but is not limited to, a gateway server, a router, a management server, a host, an access point, a base station and the like. In some embodiments, the server 130, the server 140 and the server 150 may include, for example, but is not limited to, an automatic configuration server. It is to be understood that the automatic configuration servers are provided here merely as an example, without suggesting any limitation. The server 130, the server 140 and the server 150 may further include any other servers applicable to the management user device 110. For ease of discussion, the server 130, the server 140 and the server 150 are referred to as first server 130, second server 140 and third server 150, respectively.

It would be appreciated that the respective numbers of the user devices and the servers as shown in FIG. 1 are provided only as an example, without suggesting any limitation. In the environment 100 may be included any appropriate number of user devices that can be connected to any appropriate number of servers via the IP network 120.

The user device 110 can communicate with the first server 130, the second server 140 and the third server 150 via the IP network 120. The communication in the environment 100 may follow any appropriate communication standard or protocol that is existing or will be developed in the future, for example, Universal Mobile Telecommunications System (UMTS), Long Term Evolution (LTE), LTE-Advanced (LTE-A), Fifth Generation (5G) New Radio (NR), Wireless Fidelity (Wi-Fi), and Global Interoperability for Microwave Access (WiMAX) standards, and can use any appropriate communication technologies including, for example, Multiple Input Multiple Output (MIMO), Orthogonal Frequency Division Multiplexing (OFDM), Time Division Multiplexing (TDM), Frequency Division Multiplexing (FDM), Code Division Multiplexing (CDM), Bluetooth, ZigBee, Machine Type Communication (MTC), Enhanced Mobile Broadband (eMBB), Massive Machine Type Communications (mMTC), Ultra Reliable Low Latency Communications (URLLC), Carrier Aggregation (CA), Dual Connectivity (DC) and New Radio Unlicensed (NR-U) technologies.

Figure 2:
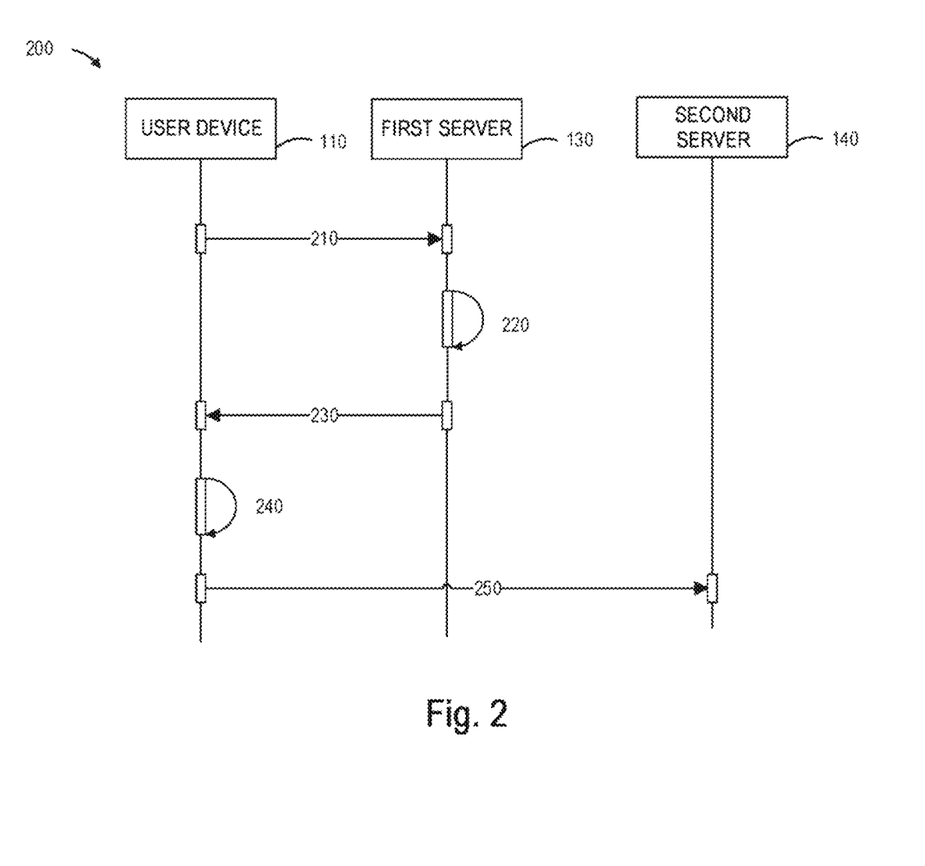
FIG. 2 illustrates a signaling process between a user device and a server according to embodiments of the present disclosure.

FIG. 2 illustrates an interaction process 200 between a user device and a server according to example embodiments of the present disclosure. Hereinafter, reference will be made to the environment 100 shown in FIG. 1 to describe the process 200.

In the process 200, the user device 110 sends (210) to the first server 130 first connection information that the user device 110 is connected to a plurality of servers. In some embodiments, the first connection information may include at least one of the following: Internet Protocol (IP) versions of the plurality of servers, IP addresses of the plurality of servers, connection establishment delays for the IP addresses, request response times for the IP addresses and durations for connecting the user device to the plurality of servers.

In some embodiments, the user device collects the first connection information based on at least one of a Customer Premises Equipment Wide Area Network Management Protocol (CWMP) message and a User Service Platform (USP) protocol message periodically that are received from the plurality of servers. The CWMP message or the USP protocol message is transmitted on connections identified by IP versions and the IP addresses of the one or more user devices. In some embodiments, the CWMP message or the USP protocol message may further include a time when the CWMP message or the USP protocol message is transmitted. As such, the user device 110 can collect an IP version and an IP address of a respective server based on a connection on which the CWMP message or the USP protocol message is transmitted, and computes a request response time, a one-way propagation delay and the like. Further, the user device 110 can determine, based on the collected information, statistics information about the connection with the specific IP version and IP address.

In some embodiments, the user device 110 transmits the first connection information to the first server 130 through at least one of Customer Premises Equipment WAN Management Protocol (CWMP) and User Service Platform (USP) protocol. For example, the CWMP message transmitted from the user device 110 to the first server 130 can be adjusted to have the data structure 1 below, for use in transmitting the first connection information by the user device:

---

Data structure 1

---

Structure Connection_Information {
Connection_Hostname;
Connection_IPVersion;
Connection_SourceIPAddress;
Connection_SourceTCPPortNumber;
Connection_DestinationIPAddress;
Connection_DestinationTCPPortNumber;
Connection_SetUpTime;
Connection_SustainTime;
Connection_StatisticsTimeStamp;
};
Structure Connection_Statistics list of Connection_Information;
Structure PreferredServer {
Preferred _IPVersion;
PreferredServer _IPAddress;
};
Structure PreferredServerPriorityList list of PreferredServer;

---

In addition or alternatively, the user device 110 may transmit the first connection information to the first server 130 in other manners. For example, the user device 110 may use a specific message for the first connection information. In some embodiments, the user device 110 may transmit the first connection information in any manner that enables the first network device 130 to acquire the first connection information.

In some embodiments, the user device 110 periodically transmits the first connection information to the first server 130. For example, the user device 110 may transmit the first connection information to the first server 130 in the CWMP message transmitted periodically. In addition or alternatively, in response to a request for first connection information, the user device 110 may send the first connection information.

In addition or alternatively, in some embodiments, in response to triggering a specific event, the user device 110 sends the first connection information to the first server 130. For example, the specific event may include that the user device 110 is connected to the first server 130 for the first time. In some embodiments, the specific event may further include that: a monitored specific parameter has changed; the user device 110 is rebooted or reconnected; the user device 110 completes uploading or downloading of a file requested by the first server 130; and the user device 110 completes a diagnosis process. In some embodiments, the user device 110 can also send the first connection information to the first server 130.

Then, the first server 130 determines (220) a plurality of candidate servers for the user device 110 at least based on the received first connection information. In some embodiments, at least based on the first connection information, the first server 130 determines a plurality of candidate servers using a neural network based machine learning model. For example, the first server 130 may store the first connection information received from the user device 110, and uses at least a part of the stored first connection information as a training sample to train the machine learning model for determining candidate servers. Upon completion of the training of the machine learning model, the first server 130 may use the first connection information further received from the user device 110 as an input to the trained machine learning model, in order to obtain one or more candidate servers as the output of the trained machine learning model. It would be appreciated that using the neural network based machine learning model to determine candidate servers for the user device 110 is provided only as an example. The first server 130 may use other machine learning models of other technical approaches to determine candidate servers for the user device 110 based on the first connection information. For example, a Bayesian network, a support vector machine, a decision trees, a random forest or the like may be used. In some embodiments, the first server 130 can train the machine learning model using the first connection information received from other user device. In some embodiments, the first server 130 can also determine candidate servers for the user device 110 using other artificial intelligence methods.

In some embodiments, the first server 130 collects second connection information that one or more user devices are connected to the first server 130. The second connection information includes statistics information on historical connections between the one or more user devices and the first server 130. The second connection information may include at least one of: Internet Protocol (IP) versions of one or more user devices, IP addresses of the one or more user devices, connection establishment delays for the IP addresses, request response times for the IP addresses, durations for connecting the one or more user devices connected to the plurality of servers and the like. In some embodiments, the first server 130 collects the second connection information based on at least one of CWMP message and USP protocol message received periodically by the one or more user devices. For example, the second connection information may include at least one of the following: an IP address version, an IP address and a request time of a user device.

In some embodiments, based on the first connection information and the second connection information, the first server 130 determines candidate servers for the user device 110 using a machine learning model. For example, the first server 130 stores the second connection information and the first connection information received from the user device 110, and uses at least a part of the stored second connection information and first connection information as a training sample to train the machine learning model for determining candidate servers. In some embodiments, based on the first connection information and the second connection information, the first server 130 may also use other artificial intelligent (AI) technologies to determine candidate servers.

In this way, in the process of determining the candidate servers for the user device 110, since the statistics information for dynamic changes of the IP network is taken into account, the server 130 can efficiently determine candidate servers suitable for the current connection of the user device 110.

In addition or alternatively, in the case of not including the first connection information and the second connection information, the first server 130 may directly determine candidate servers for the user device 110 based on a command from an operator.

After determining the candidate servers for the user device 110, the first server 130 transmits (230) a list of candidate servers to the user device 110. In some embodiments, the first server 130 transmits the list of the candidate servers to the user device 110 by at least one of the CWMP message and USP. For example, the CWMP message transmitted from the first server 130 to the user device 110 can be adjusted to have the following data structure 2, for the first server 130 to transmit the list of candidate servers to the user device 110:

| Data structure 2 |
|---|
| MangementServer. |
| ... |
| URL |
| Preferred _IPVersion |
| ServerselectionAlgorithm |
| ... |
| .MangementServer. PreferredServerlist.{i}. |
| IPAddress |
| IPVersion |

In addition or alternatively, the first server 130 can also transmit the list of candidate servers to the user device 110 in other manners. For example, the first server 130 may use a specific message for transmitting the list of candidate servers. In some embodiments, the user device 110 may also transmit the list of candidate servers in any manners that enables the user device 110 to acquire the list of candidate servers.

In some embodiments, the list of candidate servers include indications of respective priorities of the candidate servers, and those candidate servers can be arranged in an ascending or descending order in the list according to the corresponding priorities. In some embodiments, the list of candidate servers includes at least one of IP versions associated with the candidate servers, IP addresses associated with the candidate servers and host names associated with the candidate servers.

After receiving the list of candidate servers, the user device 110 selects (240) a second server 140 from the list to establish (250) a connection. In some embodiments, the second server 140 and the first server 130 may be the same server.

In some embodiments, the user device 110 may select, from the list of candidate servers, a candidate server with a priority exceeding a threshold priority as the second server 140. For example, when the candidate servers are arranged in a descending order in the list according to the respective priorities, the user device 110 may determine a priority of a candidate server ranked at the second position as a threshold priority. As such, the user device 110 may determine a second server 140 having the highest priority from the list. In some embodiments, the user device 110 may preset a threshold priority and select randomly a candidate server from candidate servers with priorities higher than the threshold priority as the second server 140. In some embodiments, the user device 110 may determine the threshold priority in other manner.

In addition or alternatively, in some embodiments, if failing to establish a connection with the second server 140, the user device 110 may select a third server having a priority lower than the priority of the second server from the list of the candidate servers to establish a connection. For example, when the candidate servers are arranged in a descending order in the list according to priorities thereof, the user device 110 may select the candidate server ranked at the second position as the third server to establish a connection.

In this way, when determining the user device 110, the first server 130 takes into account the statistics information that can reflect the global change of the network configuration, to thus enable the connection to be established between the user device and the server to adapt to the dynamic changes of the network configuration and guarantee high connection efficiency.

Moreover, the method discussed above can be used in combination with a mechanism for network load balancing, so as to optimize the performance of the IP network connection from a global perspective.

In order to make better use of the stored first and/or second connection information, the first server can perform statistical analysis on the above-mentioned information to facilitate management of the user device. Hereinafter, reference will be made to FIG. 3 illustrating an example where the first server 130 can process the above-mentioned information.

Figure 3:
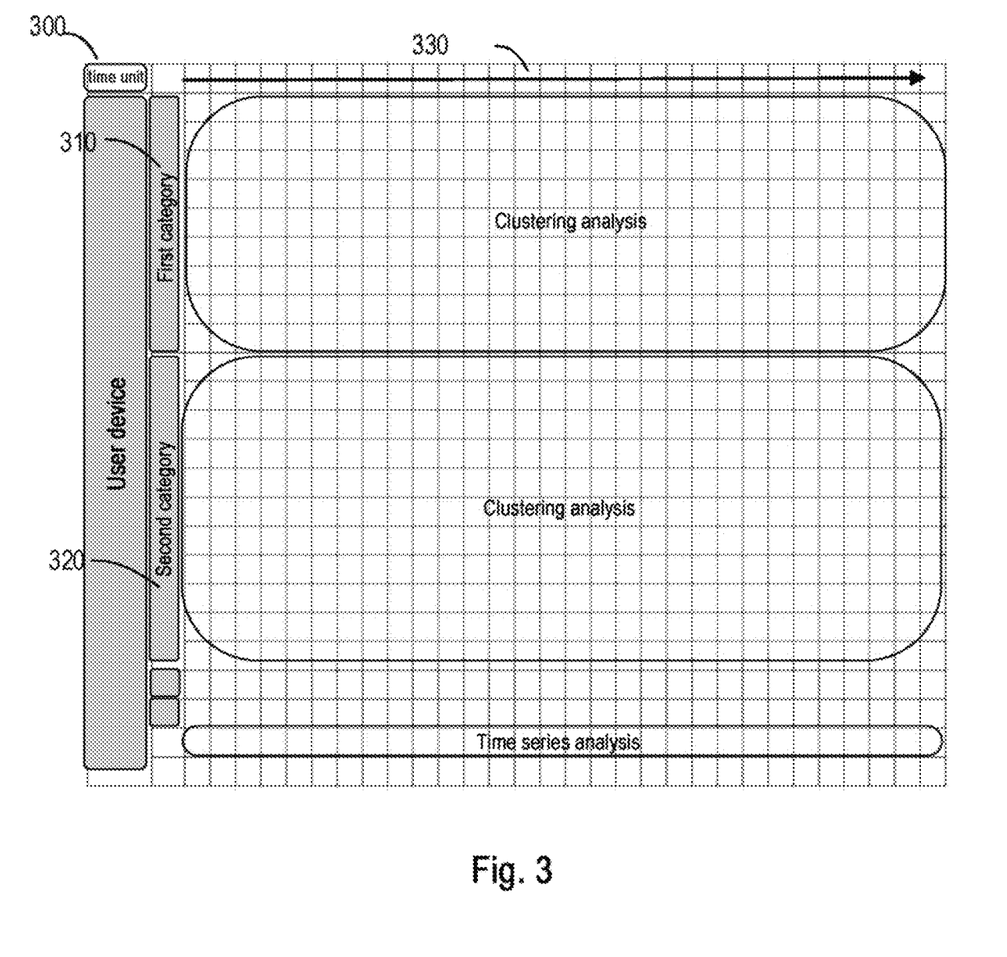
FIG. 3 illustrates a diagram for time series analysis and clustering analysis according to embodiments of the present disclosure.

FIG. 3 illustrates a diagram 300 for a server to perform time series analysis and cluster analysis according to embodiments of the present disclosure.

The diagram 300 illustrates therein processing the first and/or the second connection information stored in the first server in an example manner. In some embodiments, the first server 130 can classify one or more user devices using a clustering algorithm. For example, if one or more user devices are statistically determined to have a higher probability of sharing the same routing path to connect to the server, the first server 130 may classify the one or more servers into the same category, so as to manage those user devices. In some embodiments, for other parameters of the one or more servers, the first server 130 may perform classification using a clustering algorithm, for example, a network-based clustering method, a K-means algorithm, a density-based method, and the like. Only for example, if connections between one or more user devices and specific servers exist in the same period of time each day, those servers can be classified into a first category 310. In another example, if one or more servers have similar network performance requirements, the one or more servers can be classified into the second category 320. In addition, the first server may also classify one or more servers using any other clustering algorithm.

In some embodiments, based on time parameters of connecting the user device to the servers included in the first and second connection information, the first server 130 can perform time series analysis on the stored first and second connection information. For example, every time when sending the first connection information to the first server 130, the user device 110 can add a time label 330 to the corresponding statistics information. In this way, the first server 130 may perform time series analysis for the first connection information collected by the user device 110. For example, by means of the time series analysis, connection preference of the user device 110 within a specific period of time can be determined or analyzing a routing path within a specific period of time, to meet different connection needs of the user device 110.

Figure 4:
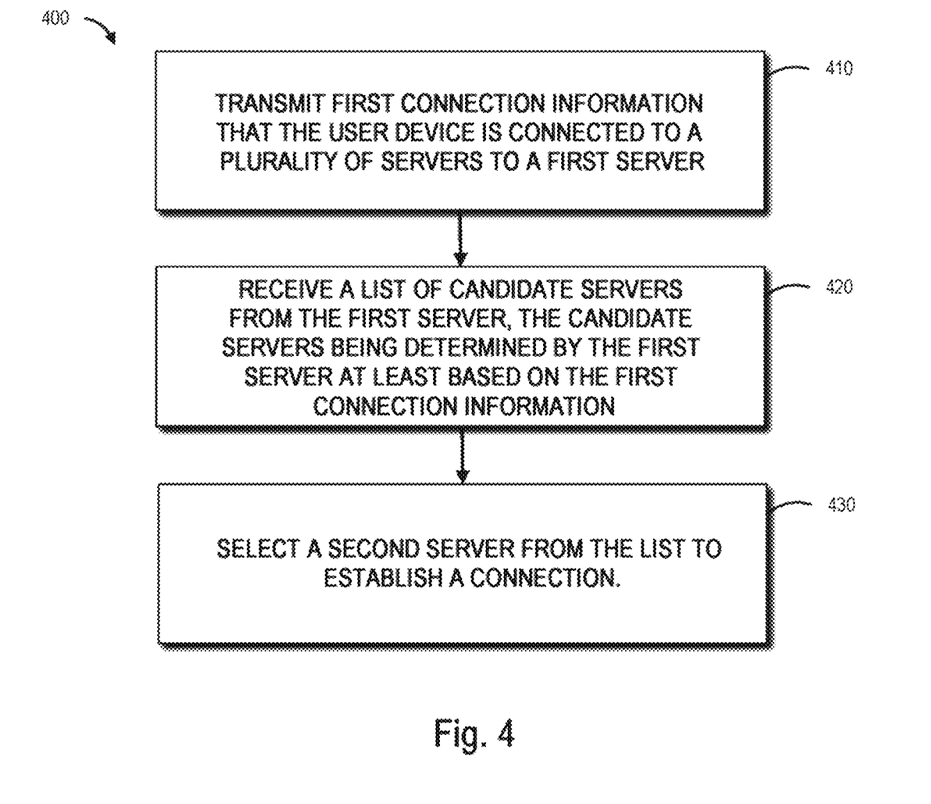
FIG. 4 illustrates a flowchart of an example method implemented at a user device according to embodiments of the present disclosure.

FIG. 4 illustrates a flowchart of an example method 400 implemented at a user device according to embodiments of the present disclosure.

The method 400 can be implemented at the user device 110 as shown in FIG. 1. For discussion, the method 400 will be described with reference to FIG. 1. It would be appreciated that the method 400 may include additional actions not shown therein and or may skip over actions shown therein, and the scope of the present disclosure is not limited in the aspect.

At 410, the user device 110 transmits first connection information that the user device 110 is connected to a plurality of servers to the first server 130.

At 420, the user device 110 receives a list of candidate servers from the first server 130, where the candidate servers are determined by the first server 130 at least based on the first connection information.

At 430, the user device 410 selects a second server 140 from the list to establish a connection.

In some embodiments, the user device 110 may collect the first connection information based on at least one of CWMP message and USP protocol message received periodically by the plurality of servers. The CWMP message or the USP protocol message is transmitted on connections identified by the IP versions and the IP addresses of the plurality of servers.

In some embodiments, transmitting, by the user device 110, the first connection information to the first server 130 includes transmitting the first connection information to the first server 130 by at least one of CWMP and USP protocol.

In some embodiments, receiving, by the user device 110, the list of candidate servers from the first server 130 includes: receiving the list of candidate servers from the first server 130 through at least one of CWMP and USP protocol.

In some embodiments, transmitting, by the user device 110, the first connection information to the first server 130 includes: periodically transmitting the first connection information to the first server 130; and in response to a request for the first connection information from the first server 130, transmitting the first connection information.

In some embodiments, the first connection information includes at least one of the following: IP versions of the plurality of servers, IP addresses of the plurality of servers, connection establishment delays for the IP addresses, request response time for the IP addresses and time for connecting the user device to the plurality of servers.

In some embodiments, the list of candidate servers includes at least one of IP versions associated with the candidate servers, IP addresses associated with the candidate servers and host names associated with the candidate servers.

In some embodiments, the list of candidate servers includes indications of respective priorities of the candidate servers, and selecting, by the user device 110, a second server from the list includes: selecting, from the list of the candidate servers, a candidate server with a priority exceeding a threshold priority as the second server.

In some embodiments, if failing to establish a connection with the second server 140, the user device 110 selects a third server having a priority lower than the priority of the second server from the list of the candidate servers to establish a connection.

Figure 5:
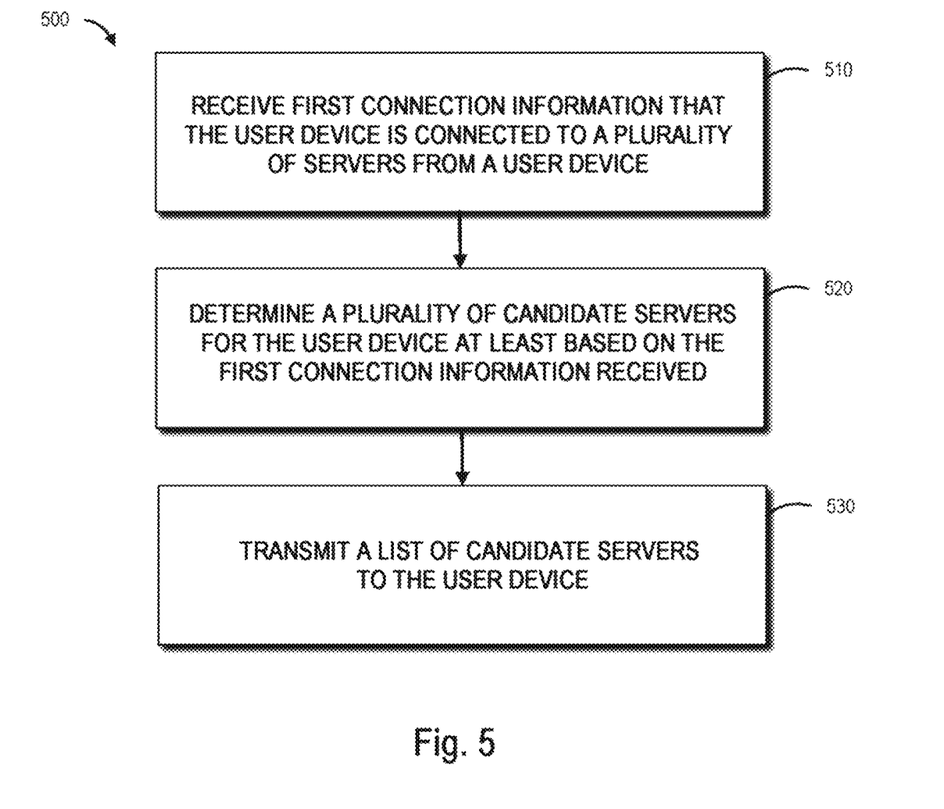
FIG. 5 illustrates a flowchart of an example method implemented at a first server according to embodiments of the present disclosure.

FIG. 5 illustrates a flowchart of an example method 500 implemented at a first server according to embodiments of the present disclosure.

The method 500 can be implemented at the first server 130 as shown in FIG. 1. For discussion, the method 500 will be described with reference to FIG. 1. It would be appreciated that the method 500 may include additional actions not shown therein and or may skip over actions shown therein, and the scope of the present disclosure is not limited in the aspect.

At 510, the first server 130 receives, from the user device 110, first connection information that the user device 110 is connected to a plurality of servers.

At 520, at least based on the received first connection information, the first server 130 determines a plurality of candidate servers for the user device 110.

At 530, the first server 130 sends a list of the candidate servers to the user device 110.

In some embodiments, determining a plurality of candidate servers for the user device 110 includes: determining a plurality of candidate servers based on the first connection information received and second connection information that one or more user devices are connected to the first server 130.

In some embodiments, the second connection information is collected by: collecting the second connection information based on at least one of CWMP message and USP protocol message received periodically by one or more user devices of the first server. The CWMP message or the USP protocol message is transmitted over connections identified by the IP versions and the IP addresses of the one or more user devices.

In some embodiments, determining a plurality of candidate servers for the user device 110 includes: based on the first connection information and the second connection information, determining the plurality of candidate servers using a machine learning model.

In some embodiments, receiving the first connection information includes: receiving the first connection information from the user device 110 by at least one of a CWMP and a USP protocol.

In some embodiments, transmitting the list of candidate servers includes: transmitting the list of candidate servers to the user device 110 by at least one of CWMP and USP protocol.

In some embodiments, receiving the first connection information includes: receiving periodically the first connection information from the user device 110, and in response to transmitting a request for the first connection information to the user device 110, receiving the first connection information from the user device 110.

In some embodiments, the first connection information includes at least one of the following: Internet Protocol (IP) versions of the plurality of servers, IP addresses of the plurality of servers, connection establishment delays for the IP addresses, request response time for the IP addresses and time for connecting the user device 110 to the plurality of servers.

In some embodiments, the first server 130 determines, based on the time for connecting the user device 110 to the plurality of servers, a probability distribution in time of a plurality of servers for the user device.

In some embodiments, the list of candidate servers includes at least one of IP versions associated with the candidate servers, IP addresses associated with the candidate servers and host names associated with the candidate servers.

Figure 6:
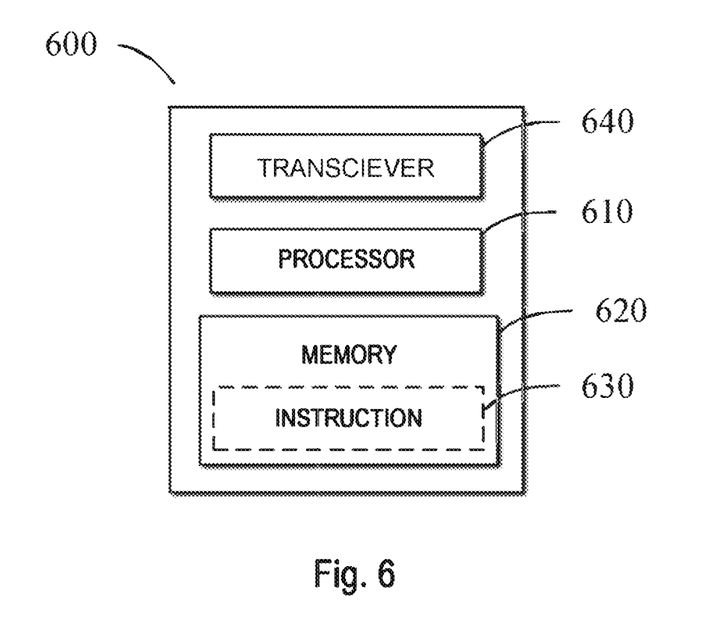
FIG. 6 illustrates a diagram of an apparatus adapted to implement embodiments of the present disclosure.

FIG. 6 illustrates a diagram of an apparatus 600 adapted to implement embodiments of the present disclosure. The apparatus 600 can be implemented as a user device 110 or first server 130 or a part thereof.

As shown therein, the apparatus 600 includes a processor 610. The processor 610 controls operations and functionalities of the apparatus 600. For example, in some example embodiments, the processor 610 can perform various operations by means of instructions 630 stored in a memory 620 coupled thereto. The memory 620 may be of any appropriate type adapted to a local technical environment, and can be implemented by any appropriate data storage technology including, but not limited to, a semiconductor-based memory device, a magnetic storage device and system, and an optical storage device and system. Although FIG. 10 only illustrates a memory unit, the apparatus 600 may include a plurality of physically different memory units.

The memory 610 may be of any appropriate type adapted to a local technical environment, and can include, but is not limited to, one or more of a general purpose computer, a special purpose computer, a microcontroller, a Digital Signal Processor (DSP) and a controller-based multicore controller architecture. The apparatus 600 may include a plurality of processors 610. The processor 610 is coupled to a transceiver 640. The transceiver 640 can implement information reception and transmission by means of a fiber optic, a cable and/or other component. The processor 1010 can cause the method 400 described above with reference to FIG. 4 or the method 500 described above with reference to FIG. 5 to be implemented by performing instructions.

In general, various example embodiments of the present disclosure can be implemented in hardware or a dedicated circuit, software, logic or any combination thereof. Some aspects can be implemented in hardware while some other aspects can be carried out in firmware or software executed by a controller, microprocessor or other computing device. When the respective aspects of the example embodiments of the present disclosure are depicted or described as block diagrams, flowcharts or some other graphic representations, it would be appreciated that the blocks, apparatus, system, technique or method described here may, by way of a non-limiting example, be implemented in hardware, software, firmware, dedicated circuits or logic, general hardware or a controller or other computing device, or a combination of some of them.

For instance, the example embodiments of the present disclosure can be described in the context of machine executable instructions that are included, for example, in a program module executed in a device on a real or virtual processor of a target. Generally speaking, program modules include routines, programs, libraries, objects, categories, components, data structures and the like, which perform particular tasks or implement particular abstract data structures. In various example embodiments, the functionalities of program modules can be merged or split among the program modules described here. Machine executable instructions for program modules can be performed within a local or distributed device. In a distributed device, the program modules can be located in both of a local and a remote storage medium.

Computer program codes for carrying out the method of the present disclosure may be programed using one or more programming languages. Those computer program codes can be provided to a general purpose computer, a special purpose computer or processors of other programmable data processing devices such that they can cause the functions/operations specified in the flowchart and/or block diagram to be implemented when executed by a computer or other programmable data processing device. The program codes may be executed entirely on the computer, partly on the computer, as a stand-alone software package, partly on the computer and partly on a remote computer or entirely on the remote computer or server.

In the context of the present disclosure, the machine readable medium may be any tangible medium that includes or stores a program for or related to an instruction execution system, apparatus, or device. The machine readable medium may be a machine readable signal medium or machine readable storage medium. The machine readable medium may include, but is not limited to, an electronic, magnetic, optical, electromagnetic, infrared or semiconductor system, device or equipment, or any suitable combination thereof. More specific examples of the machine-readable storage medium include an electrical connection with one or more wires, a portable computer disk, a hard disk, a Random-Access Memory (RAM), a Read-Only Memory (ROM), an Erasable Programmable Read-Only Memory (EPROM or flash memory), an optical storage device, a magnetic storage device, or any suitable combination thereof.

In addition, although the operations are depicted in a specific order, it should not be construed as requiring that the operations be completed in the specific order as shown or in a successive order, or the operations as shown be all implemented to achieve the desired result. In some circumstances, multitask or parallel processing may be beneficial. Likewise, although the discussion above covers some specific implementation details, this should be understood as description on specific example embodiments for a specific invention, rather than limiting scope of any invention or claims. Certain features described in the contexts of separate example embodiments described herein may be implemented in combination in a single example embodiment. Conversely, various features described in a context of a single example embodiment can be implemented separately in multiple example embodiments or in any appropriate sub-combination.

By way of non-limiting examples, the above has been given a complete and informative description of the exemplary embodiments of the present disclosure. Considering the foregoing description, in conjunction with the drawings and the appended claims, various modifications and adaptions are apparent to the skilled in the relevant art. However, all the modifications taught by the present disclosure and the like still fall into the scope of the present disclosure as defined by the appended claims. In fact, there is a further embodiment covering a combination of one or more embodiments with any other embodiment discussed above.

In some aspects, there is provided a user device, including: at least one processor; and at least one memory having computer program codes. The at least one memory and the computer program codes are configured, together with the at least one processor, to cause the user device to: transmit, to a first server, first connection information that the user device is connected to a plurality of servers. The user device is further caused to receive a list of candidate servers from the first server, where the candidate servers are determined by the first server at least based on the first connection information, and to select a second server from the list to establish a connection.

In some examples, the user device is further caused to: collect the first connection information based on at least one of CWMP message and USP protocol message received periodically by the plurality of servers. The CWMP message or the USP protocol message is transmitted on connections identified by the IP versions and the IP addresses of the plurality of servers.

In some examples, the user device is caused to transmit the first connection information to the first server by: transmitting the first connection information to the first server by at least one of CWMP and USP protocol.

In some examples, the user device is caused to receive the list of the candidate servers from the first server through an operation of: receiving the list of the candidate servers through at least one of CWMP and USP protocol.

In some examples, the user device is caused to transmit the first connection information to the first server through at least one of the following: transmitting periodically the first connection information to the first server; and in response to a request for the first connection information from the first server, transmitting the first connection information.

In some examples, the first connection information includes at least one of the following: IP versions of the plurality of servers, IP addresses of the plurality of servers, connection establishment delays for the IP addresses, request response times for the IP addresses and durations for connecting the user device to the plurality of servers.

In some examples, the list of candidate servers includes at least one of IP versions associated with the candidate servers, IP addresses associated with the candidate servers and host names associated with the candidate servers.

In some examples, the list of the candidate servers includes indications of respective priorities of the candidate servers, and the user device is further caused to select a second server from the list of the candidate servers through an operation of: selecting, from the list of the candidate servers, a candidate server having a priority exceeding a threshold priority as the second server.

In some embodiments, the user device is further caused to: if failing to establish a connection with the second server, select, from the list of candidate servers, a third server having a priority lower than the priority of the second server to establish a connection.

In some aspects, there is provided a first server, including: at least one processor; and at least one memory having computer program codes. The at least one memory and the computer program codes are configured, together with the at least one processor, to cause the first server to: receive, from a user device, first connection information that the user device is connected to a plurality of servers; determine a plurality of candidate servers for the user device at least based on the first connection information received; and transmit a list of candidate servers to the user device.

In some embodiments, the first server is further caused to determine the plurality of candidate servers through an operation of: determining a plurality of candidate servers based on the first connection information received and second connection information that one or more user devices are connected to the first server.

In some embodiments, the first server is caused to collect the second connection information through an operation of: collecting the second connection information based on at least one of CWMP message and USP protocol message received periodically by the one or more user devices connected to the first server. The CWMP message or the USP protocol message is transmitted over connections identified by the IP versions and the IP addresses of the plurality of servers.

In some embodiments, the first server is caused to receive the first connection information through an operation of: receiving the first connection information through at least one of CWMP and USP protocol.

In some embodiments, the first server is caused to transmit the list of the candidate servers through an operation of: transmitting the list of the candidate servers to the user device through at least one of CWMP and USP protocol.

In some embodiments, the first server is further caused to receive the first connection information through at least of the following: receiving periodically the first connection information from the user device, and in response to transmitting a request for the first connection information to the user device, receiving the first connection information from the user device.

In some embodiments, the first connection information includes at least one of the following: IP versions of the plurality of servers, IP addresses of the plurality of servers, connection establishment delays for the IP addresses, request response time for the IP addresses and time for connecting the user device to the plurality of servers.

In some embodiments, the first server is further caused to: determine a probability distribution in time of a plurality of servers for the user device based on the durations for connecting the user device to the plurality of servers In some embodiments, the list of the candidate servers includes at least one of IP versions associated with the candidate servers, IP addresses associated with the candidate servers and host names associated with the candidate servers.

In some aspects, there is provided an apparatus for a user device, including: means for transmitting, to a first server, first connection information that the user device is connected to a plurality of servers. The apparatus further includes: means for receiving a list of candidate servers from the first server, where the candidate servers are determined by the first server at least based on the first connection information, and means for selecting a second server from the list to establish a connection.

In some embodiments, the apparatus further includes: means for collecting the first connection information based on at least one of CWMP message and USP protocol message received periodically by the one or more user devices connected to the first server. The CWMP message or the USP protocol message is transmitted over connections identified by the IP versions and the IP addresses of the plurality of servers.

In some embodiments, the apparatus further includes: a component for transmitting the first connection information to the first server through at least one of CWMP and USP protocol.

In some embodiments, the apparatus further includes: a component for receiving the first connection information from the first server through at least one of CWMP and USP protocol.

In some embodiments, the apparatus further includes: means for transmitting periodically the first connection information to the first server; and means for transmitting the first connection information in response to a request for the first connection information from the first server.

In some embodiments, the first connection information includes at least one of: IP versions of the plurality of servers, IP addresses of the plurality of servers, connection establishment delays for the IP addresses, request response times for the IP addresses and durations for connecting the user device to the plurality of servers.

In some examples, the list of candidate servers includes at least one of the following associated with the candidate servers: IP versions, IP addresses and host names.

In some examples, the list of the candidate servers includes indications of respective priorities of the candidate servers, and the user device is further caused to select a second server from the list of the candidate servers by: selecting, from the list of the candidate servers, a candidate server with a priority exceeding a threshold priority as the second server.

In some examples, the apparatus further includes: means for selecting, from the list of candidate servers, a third server with a priority lower than the priority of the second server to establish a connection if failing to establish a connection with the second server.

In some aspects, there is provided an apparatus for a first server. The apparatus includes: means for receiving, from a user device, first connection information that the user device is connected to a plurality of servers; means for determining a plurality of candidate servers for the user device at least based on the first connection information received; and a component for transmitting a list of the candidate servers to the user device.

In some embodiments, the apparatus further includes: means for determining the plurality of candidate servers for the user device based on the first connection information received and second connection information that one or more user devices are connected to the first server.

In some embodiments, the apparatus further includes: means for collecting the second connection information based at least one of the CWMP message and USP protocol message received periodically from the one or more user devices connected to the first server. The CWMP message or the USP protocol message is transmitted on connections identified by the IP versions and the IP addresses of the plurality of servers.

In some embodiments, the apparatus further includes: a component for receiving the first connection information from the user device by at least one of CWMP and USP protocol.

In some embodiments, the apparatus further includes: means for transmitting the first connection to the user device by at least one of a Customer Premises Equipment Wide Area Network Management Protocol (CWMP) and a User Service Platform (USP) protocol.

In some embodiments, the apparatus further includes: means for receiving periodically the first connection information from the user device, and means for receiving the first connection information from the user device in response to transmitting a request for the first connection information to the user device.

In some embodiments, the first connection information includes at least one of: IP versions of the plurality of servers, IP addresses of the plurality of servers, connection establishment delays for the IP addresses, request response time for the IP addresses and time for connecting the user device to the plurality of servers.

In some embodiments, the apparatus further includes: a component for determining a probability distribution in time of a plurality of servers for the user device based on the durations for connecting the user device to the plurality of servers.

In some embodiments, the list of candidate servers includes at least one of: IP versions associated with the candidate servers, IP addresses associated with the candidate servers and host names associated with the candidate servers.

In some aspects, there is provided a computer readable storage medium having program codes stored thereon, where the program codes are configured to cause, when executed, the apparatus to perform steps in accordance with the above aspects.

We claim:

1. A user device, comprising:
at least one processor; and
at least one memory storing computer program codes;
the at least one memory and the computer program codes being configured, with the at least one memory, to cause the user device to:

transmit, to a first server, first connection information of a plurality of servers to which the user device is connected;

receive a list of candidate servers from the first server, the candidate servers being determined by the first server at least based on the first connection information; and select a second server from the list to establish a connection.

2. The user device of claim 1, wherein the user device is further caused to:

collect the first connection information based on at least one of a Customer Premises Equipment Wide Area Network Management Protocol (CWMP) message or a User Service Platform (USP) protocol message received periodically from the plurality of servers, the CWMP message or the USP protocol message being transmitted on connections identified by Internet Protocol (IP) versions and IP addresses of the plurality of servers.

3. The user device of claim 1, wherein the user device is further caused to transmit the first connection information to the first server by:

transmitting the first connection information to the first server by at least one of CWMP or USP protocol.

4. The user device of claim 1, wherein the user device is further caused to receive the list of the candidate servers from the first server by:

receiving the list of the candidate servers from the first server by at least one of CWMP or USP protocol.

5. The user device of claim 1, wherein the user device is caused to transmit the first connection information to the first server by at least one of:

transmitting periodically the first connection information to the first server; or in response to a request for the first connection information from the first server, transmitting the first connection information.

6. The user device of claim 1, wherein the first connection information comprises at least one of:

IP versions of the plurality of servers;
IP addresses of the plurality of servers;
connection establishment delays for the IP addresses;
request response time for the IP addresses; or
time for connecting the user device to the plurality of servers.

7. The user device of claim 1, wherein the list of the candidate servers comprises at least one of IP versions associated with the candidate servers, IP addresses associated with the candidate servers, or host names associated with the candidate servers.

8. The user device of claim 1, wherein the list of the candidate servers comprises indications of respective priorities of the candidate servers, and the user device is further caused to select the second server from the list of the candidate servers by:

selecting, from the list of the candidate servers, a candidate server having a priority exceeding a threshold priority as the second server.

9. The user device of claim 1, wherein the user device is further caused to:

select, from the list of the candidate servers, a third server having a priority lower than the priority of the second server to establish a connection based on that establishing the connection with the second server is unsuccessful.

10. A first server, comprising:
at least one processor; and
at least one memory storing computer program codes;
the at least one memory and the computer program codes being configured, with the at least one processor, to cause the first server to:

receive, from a user device, first connection information of a plurality of servers to which the user device is connected;

determine a plurality of candidate servers for the user device at least based on the received first connection information; and transmit a list of the candidate servers to the user device.

11. The first server of claim 10, wherein the first server is further caused to determine the plurality of candidate servers by:

determining the plurality of candidate servers based on the received first connection information and second connection information that one or more user devices are connected to the first server.

12. The first server of claim 11, wherein the first server is caused to collect the second connection information by:

collecting the second connection information based on at least one of a Customer Premises Equipment Wide Area Network Management Protocol (CWMP) message and a User Service Platform (USP) protocol message received periodically from the one or more user devices connected to the first server, the CWMP message or the USP protocol message being transmitted on connections identified by Internet Protocol (IP) versions and IP addresses of the plurality of servers.

13. The first server of claim 10, wherein the first server is further caused to determine the plurality of candidate servers by:

determining, based on the first connection information and the second connection information, the plurality of candidate servers using a machine learning model.

14. The first server of claim 10, wherein the first server is further caused to receive the first connection information by:

receiving the first connection information by at least one of CWMP or a USP protocol.

15. The first server of claim 10, wherein the first server is further caused to transmit the list of the candidate servers by:

transmitting the list of the candidate servers to the user device by at least one of CWMP or USP protocol.

16. The first server of claim 10, wherein the first server is further caused to receive the first connection information by at least of:

receiving periodically the first connection information from the user device; or in response to transmitting a request for the first connection information to the user device, receiving the first connection information from the user device.

17. The first server of claim 10, wherein the first connection information comprises at least one of the following:

Internet Protocol (IP) versions of the plurality of servers;
IP addresses of the plurality of servers;
connection establishment delays for the IP addresses;
request response times for the IP addresses; or
time for connecting the user device to the plurality of servers.

18. The first server of claim 17, wherein the first server is further caused to:

determine a probability distribution in time of the plurality of servers for the user device based on the time for connecting the user device to the plurality of servers.

19. The first server of claim 10, wherein the list of the candidate servers comprises at least one of Internet Protocol (IP) versions associated with the candidate servers, IP addresses associated with the candidate servers, or host names associated with the candidate servers.

\* \* \* \* \*